(12) United States Patent
Koyama et al.

(10) Patent No.: US 9,555,791 B2
(45) Date of Patent: Jan. 31, 2017

(54) HYDRAULIC UNIT FOR VEHICLE BRAKE APPARATUS

(71) Applicants: DENSO CORPORATION, Kariya, Aichi-pref. (JP); ADVICS CO., LTD., Kariya, Aichi-pref. (JP)

(72) Inventors: Fumitoshi Koyama, Kariya (JP); Shin Sasaki, Okazaki (JP); Jun Oonishi, Obu (JP)

(73) Assignee: ADVICS CO., LTD., Kariya, Aichi-pref. (JP)

( * ) Notice: Subject to any disclaimer, the term of this patent is extended or adjusted under 35 U.S.C. 154(b) by 0 days.

(21) Appl. No.: 14/735,885

(22) Filed: Jun. 10, 2015

(65) Prior Publication Data

US 2015/0360669 A1 Dec. 17, 2015

(30) Foreign Application Priority Data

Jun. 12, 2014 (JP) .................................. 2014-121652

(51) Int. Cl.
| | |
|---|---|
| B60T 8/36 | (2006.01) |
| B60T 17/02 | (2006.01) |
| B60T 13/16 | (2006.01) |
| B60T 13/66 | (2006.01) |
| B60T 13/68 | (2006.01) |
| F04C 2/10 | (2006.01) |

(52) U.S. Cl.
CPC ................ B60T 17/02 (2013.01); B60T 8/368 (2013.01); B60T 13/161 (2013.01); B60T 13/166 (2013.01); B60T 13/662 (2013.01); B60T 13/686 (2013.01); F04C 2/10 (2013.01)

(58) Field of Classification Search
CPC ...... B60T 8/368; B60T 8/3675; B60T 13/161; B60T 17/02; F15B 2201/405
USPC .................................. 303/87, 119.3, DIG. 10
See application file for complete search history.

(56) References Cited

U.S. PATENT DOCUMENTS

| | | | | |
|---|---|---|---|---|
| 4,861,118 | A | * | 8/1989 | Burckhardt ............... B60T 8/40 180/197 |
| 6,142,751 | A | * | 11/2000 | Krauter ................... B60T 8/368 303/116.4 |

(Continued)

FOREIGN PATENT DOCUMENTS

| | | |
|---|---|---|
| JP | H09-132131 | 5/1997 |
| JP | WO9748583 | 12/1997 |

(Continued)

*Primary Examiner* — Christopher Schwartz
(74) *Attorney, Agent, or Firm* — Knobbe, Martens, Olson & Bear, LLP

(57) ABSTRACT

A hydraulic unit for a vehicle brake apparatus having a master cylinder and a wheel cylinder includes a housing formed with a pipe line connecting between the master cylinder and the wheel cylinder, a pump disposed in the housing for sucking and discharging a brake fluid to boost pressure of the brake fluid, and a reservoir piston disposed in a hole formed in the housing so as to be movable slidably back and forth, the reservoir piston partitioning a reservoir chamber within the hole for temporarily storing the brake fluid discharged from the wheel cylinder. The hydraulic unit further includes a cover disposed in the hole to close one end on an atmospheric side of the hole, the cover being formed with a fluid reservoir chamber for storing the brake fluid leaking from the pump.

10 Claims, 2 Drawing Sheets

(56) References Cited

U.S. PATENT DOCUMENTS

| | | | |
|---|---|---|---|
| 7,866,764 B2* | 1/2011 | Crimpita | B60T 8/368 303/116.4 |
| 9,073,526 B2* | 7/2015 | Kodama | B60T 8/368 |
| 2004/0244371 A1* | 12/2004 | Takumori | B60T 8/3685 60/591 |
| 2005/0146210 A1* | 7/2005 | Hinz | B60T 8/368 303/119.3 |
| 2006/0099090 A1 | 5/2006 | Kramp et al. | |
| 2006/0245963 A1 | 11/2006 | Mori et al. | |
| 2011/0239641 A1* | 10/2011 | Kodama | B60T 8/368 60/585 |

FOREIGN PATENT DOCUMENTS

| | | |
|---|---|---|
| JP | 2004-338565 | 12/2004 |
| JP | 2005-516837 | 6/2005 |
| JP | 2006-307688 | 11/2006 |
| JP | 2007-001319 | 1/2007 |
| JP | 2007-145043 | 6/2007 |
| JP | 2009-262924 | 11/2009 |
| JP | 2010-069992 | 4/2010 |

* cited by examiner

HYDRAULIC UNIT FOR VEHICLE BRAKE APPARATUS

This application claims priority to Japanese Patent Application No. 2014-121652 filed on Jun. 12, 2014, the entire contents of which are hereby incorporated by reference.

BACKGROUND OF THE INVENTION

1. Field of the Invention

The present invention relates to a hydraulic unit for a vehicle brake apparatus.

2. Description of Related Art

Japanese Patent Application Laid-open No. 2009-262924 describes a hydraulic unit for a vehicle brake apparatus. This hydraulic unit has a structure in which an ECU case formed with a recess portion is assembled to a housing such that the recess portion is in communication with a housing chamber which houses a pump so that the recess portion serves as a fluid reservoir for storing brake fluid leaking from the pump. Further, to prevent the brake fluid from leaking to the outside from the fluid reservoir, a seal member is disposed at the matching surface between the ECU case and the housing.

However, the above conventional hydraulic unit for a vehicle brake apparatus has a problem in that since the ECU case is formed with the recess portion as a fluid reservoir, there is a concern that, if the brake fluid leaks from the fluid reservoir due to degradation of the seal member, the brake fluid may adhere to an ECU housed in the ECU case causing an electrical defect.

SUMMARY

An exemplary embodiment provides a hydraulic unit for a vehicle brake apparatus having a master cylinder and a wheel cylinder including:

a housing formed with a pipe line connecting between the master cylinder and the wheel cylinder to allow a brake fluid to pass therethrough;

a pump disposed in the housing for sucking and discharging the brake fluid to boost pressure of the brake fluid;

a reservoir piston disposed in a hole formed in the housing so as to be movable slidably back and forth, the reservoir piston partitioning a reservoir chamber within the hole for temporarily storing the brake fluid discharged from the wheel cylinder;

a cover disposed in the hole to close one end on an atmospheric side of the hole, the cover being formed with a fluid reservoir chamber for storing the brake fluid leaking from the pump; and a drain passage formed in the housing for leading the brake fluid leaking from the pump into the fluid reservoir chamber.

According to the exemplary embodiment, there is provided a hydraulic unit for a vehicle brake apparatus, which is resistant to leakage of a brake fluid from its fluid reservoir chamber to prevent occurrence of electrical defect.

Other advantages and features of the invention will become apparent from the following description including the drawings and claims.

PREFERRED EMBODIMENTS OF THE INVENTION

Figure 1:
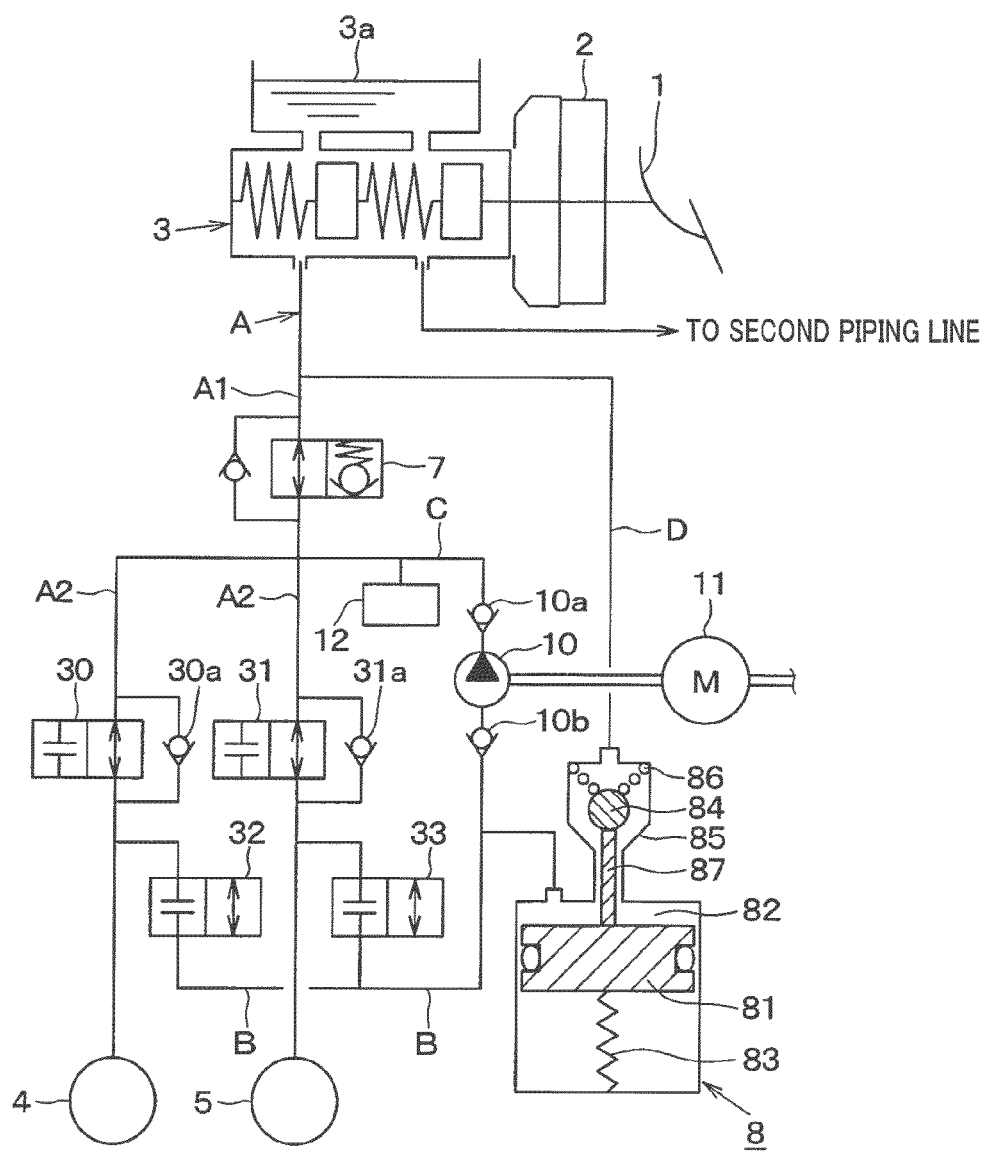
FIG. 1 is a schematic piping diagram of a vehicle brake apparatus including a hydraulic unit according to an embodiment of the invention.

FIG. 1 is a schematic piping diagram of a brake apparatus including a hydraulic unit according to an embodiment of the invention. The vehicle brake apparatus, which is for a four-wheel front-wheel drive vehicle, has an X-type dual hydraulic circuit including a first piping line from the right front wheel to the left rear wheel and a second piping line from the left front wheel to the right rear wheel.

As shown in FIG. 1, a brake pedal 1 of the vehicle is connected to a booster unit 2 for boosting a depression force applied to the brake pedal 1 by a vehicle driver.

The booster unit 2 includes a push rod for transmitting the boosted depression force to a master cylinder 3. When the push rod pushes a master piston disposed within the master cylinder 3, a master cylinder pressure is generated. The brake pedal 1, the booster unit 2 and the master cylinder 3 constitute a brake fluid pressure generating section.

The master cylinder 3 is connected with a master reservoir 3a for supplying the brake fluid into the master cylinder 3 and for storing a surplus amount of the brake fluid within the master cylinder 3.

The master cylinder pressure is transmitted to a wheel cylinder 4 of the right front wheel and a wheel cylinder 5 of a left rear wheel through an ABS (Anti-lock Brake System). In the following, the operation of the first piping line from the right front wheel to the left rear wheel is explained. Since the operation of the second piping line from the left front wheel to the right rear wheel is the same as the first piping line, the explanation therefor is omitted.

The vehicle brake apparatus further includes a main pipe line (referred to as the "pipe line A" hereinafter) connected to the master cylinder 3 . The pipe line A is provided with a differential pressure control valve 7. The pipe line A is separated into a pipe line A1 which extends from the master cylinder 3 to the differential pressure control valve 7 and receives the master cylinder pressure, and a pipe line A2 which extends from the differential pressure control valve 7 to the wheel cylinders 4 and 5.

The differential pressure control valve 7 is switched between the communicating state and the differential pressure state. Normally, the differential pressure control valve 7 is set to the communicating state. To maintain the pressure on the side of the wheel cylinders 4 and 5 higher than the pressure on the side of the master cylinder 3 by a predetermined differential pressure, the differential pressure control valve 7 is switched to the differential pressure state.

The pipe line A2 branches into two, one branch being provided with a boost control valve 30 for controlling increase of the brake fluid supplied to the wheel cylinder 4, the other branch being provided with a boost control valve 31 for controlling increase of the brake fluid supplied to the wheel cylinder 5.

Each of the boost control valves 30 and 31 is a two position valve switched between the communicating state and the shut-off state by an ECU (not shown) for brake fluid pressure control . When the two position valve is switched to the communicating state, the brake fluid pressure resulting from the master cylinder pressure is applied to the wheel cylinder 4 or 5. These boost control valves 30 and 31 are normally set to the communicating state during normal braking operation in which an ABS or the like does not operate.

The boost control valves 30 and 31 are parallel-connected with safety valves 30a and 30b, respectively so that the brake fluid can be removed from the wheel cylinders 4 and 5 when the brake pedal 1 is released when the ABS is in operation.

The pipe line A is connected to a pressure regulation reservoir 8 through pipe lines B at its portions between the boost control valves 30 and 31 and the wheel cylinders 4 and 5 to make it possible to prevent the wheels from being locked, by releasing the brake fluid to the pressure regulation reservoir 8 through the pipe lines B to appropriately control the brake fluid pressures at the wheel cylinders 4 and 5.

The pipe lines B are provided with pressure reduction control valves 32 and 33, respectively which are switched between the communicating state and the shut-off state by the ECU. The pressure reduction control valves 32 and 33 are normally set to the communicating state during normal braking operation in which the ABS does not operate.

The pipe line A is connected to the pressure regulation reservoir 8 through a pipe line C at its portion between the differential pressure control valve 7 and the boost control valves 30 and 31. The pipe line C is provided with a pump 10 with check valves 10a and 10b. The pump 10 is driven by an electric motor 11 for sucking and discharging the brake fluid.

Further, the pipe line C is provided with an accumulator 12 at its portion downstream of the pump 10 for suppressing pulsation of the brake fluid discharged from the pump 10. The pressure regulation reservoir 8 and the master cylinder 3 are connected to each other through a pipe line D. The pump 10 sucks the brake fluid in the pipe line A1 through the pipe line D and the pressure regulation reservoir 8, and discharges it to the pipe line A2 to boost the wheel cylinder pressure.

The pressure regulation reservoir 8 includes a reservoir piston 81 disposed movably back and forth in a hole formed in a later-explained housing. The reservoir piston 81 partitions a reservoir chamber 82 for temporarily storing the brake fluid discharged from the wheel cylinders 4 and 5. The reservoir piston 81 is biased in a direction to reduce the volume of the reservoir chamber 82 by a piston spring 83.

The pressure regulation reservoir 8 has a structure in which a valve body 84 sits on and separates from a valve seat 85 to communicate and shut off between the pipe line D and the reservoir chamber 82. The valve body 84 is biased in the valve closing direction by a valve spring 86. The reservoir piston 81 and the valve body 84 communicate with each other through a shaft 87. When the reservoir piston 81 moves in the direction to reduce the volume of the reservoir chamber 82, the valve body 84 moves in the valve opening direction.

Figure 2:
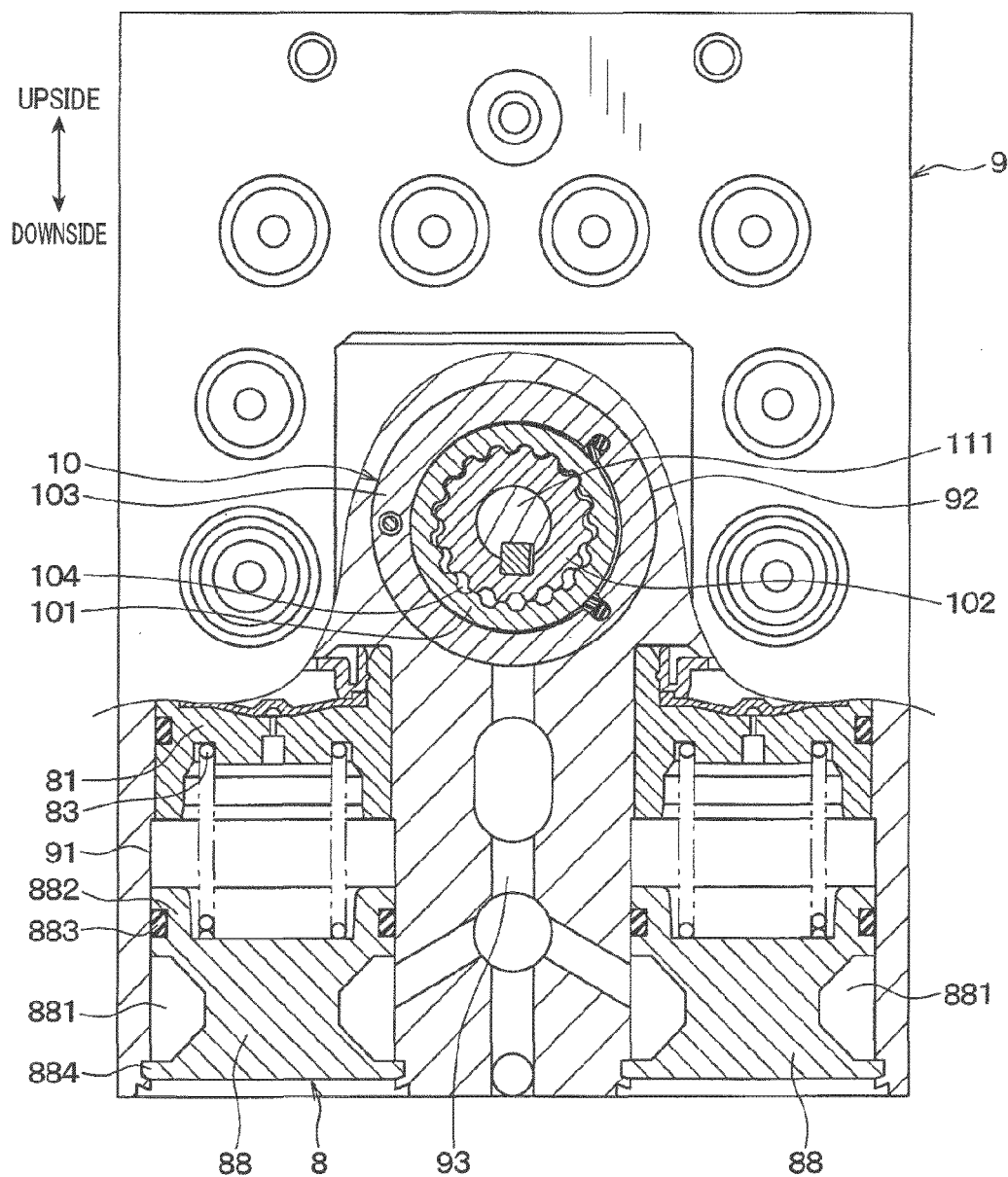
FIG. 2 is a partial cross-sectional view of the hydraulic unit of the vehicle brake apparatus shown in FIG. 1.

As shown in FIG. 2, the hydraulic unit includes the housing 9 which has a roughly rectangular shape and forms the outer shape thereof. The housing 9 houses the pump 10 and the pressure regulation reservoir 8. Although not shown in FIG. 2, the motor 11 is disposed on one side of the housing 9, and the ECU is disposed on the other side of the housing 9.

The housing 9, which is made of nonferrous metal such as aluminum, is formed with two holes 91 which open to the bottom surface of the housing 9. The reservoir pistons 81 are contained in the holes 91 on the bottom sides of the holes 91. The open ends of the holes 91 are closed by covers 88, respectively.

The cover 88 is made of nonferrous metal, and has roughly a cylindrical shape. The outer peripheral portion of the cover 88 is formed in a recess shape to form a fluid reservoir chamber 881.

One end portion of the cover 88, which is more to the side of the reservoir piston 8 than the fluid reservoir chamber 881 is, is formed with a first flange portion 882 projecting radially outward. An O-ring 883 is fitted in an annular groove formed in the outer periphery of the first flange portion 882 to seal between the first flange portion 882 and the housing 9.

The other end portion of the cover 88, which is more to the side opposite the reservoir piston 8 than the fluid reservoir chamber 881 is, is formed with a second flange portion 884 projecting radially outward. To seal between the second flange portion 884 and the housing 9, a portion of the housing 9, which is in the vicinity of the open end on the side of the atmosphere of the hole 91, is swaged to sandwich the outer peripheral edge of the second flange portion 884.

The housing 9 is formed with a housing hole 92 for housing the pump 10. The housing hole 92 is located above the fluid reservoir chamber 881.

In this embodiment, the pump 10 is an internal gear pump (trochoid pump). More specifically, the pump 10 includes an outer rotor 101 formed with inner teeth at its inner periphery, an inner rotor 102 formed with outer teeth at its outer periphery and a case 103 housing the outer rotor 101 and the inner rotor 102, the rotating shaft 111 of the motor 11 being inserted in a hole located at the center of the inner rotor 101.

The inner teeth of the outer rotor 101 and the outer teeth of the inner rotor 102 mesh with each other so as to form gap portions 104. The volumes of the gap portions 104 are changed with the rotations of the outer rotor 101 and the inner rotor 102 to suck or discharge the brake fluid.

The housing 9 is formed with a drain passage 93 which communicates between the fluid reservoir chamber 881 and the housing hole 92 to enable leading the brake fluid leaking from the pump 10 to the fluid reserving chamber 881.

Next, the operation of the brake apparatus having the above described structure is explained. First, the operation of the pressure regulation reservoir 8 is explained. During normal braking operation, the reservoir piston 81 is pushed in the upward direction in FIG. 2 by the piston spring 83, causing the shaft 87 to push the valve body 84 to separate from valve seat 85.

Accordingly, when the brake fluid is supplied through the pipe line D, it is stored in the reservoir chamber 82. The brake fluid stored in the reservoir chamber 82 is sucked into the pump 10 through the pipe line B, and supplied to the wheel cylinders 4 and 5 to be controlled.

Thereafter, the inflow rate of the brake fluid into the reservoir chamber 82 exceeds the suction rate of the brake fluid into the pump 10, as a result of which the brake fluid stats to be stored in the reservoir chamber 82. In this state, when the movement amount of the reservoir piston 81 exceeds the valve lift amount of the valve body 84, the valve body 84 contacts the valve seat 85. As a result, the inflow of the brake fluid into the reservoir chamber 82 is restricted. In this way, the brake fluid can be prevented from reaching the bottom dead center of the reservoir piston 81 within the reservoir chamber 82 to prevent the high-pressure brake fluid on the upstream side of the pressure regulation reservoir 8 (on the side of the pipe line D) from being supplied directly to the pump 10 disposed on the downstream side of the pressure regulation reservoir 8 (on the side of the pipe line B and pipe line C).

Next, the operation of the brake apparatus including the pressure regulation reservoir 8 is explained.

During normal braking operation in which ABS control or assist control is not performed, the differential pressure control valve 7 is set in the communicating state. In this state, the master cylinder pressure generated by the brake pedal 1 depressed by the driver is directly applied to the wheel cylinders 4 and 5. At this time, since the pump 10 is not in operation, the valve body 84 is in contact with the valve seat 85 so that the master cylinder pressure is not applied to the suction opening of the pump 10.

When it is required to increase a braking force compared to by normal braking operation, for example, when the deceleration of the vehicle is detected to exceed a predetermined threshold by a not shown acceleration sensor or the like, the differential pressure control valve 7 is switched to the differential pressure state to assist the depression force of the brake pedal 1 operated by the driver. As a result, the brake fluid is passed into the pressure regulation chamber 8 from the pipe line A1 through the pipe line D. Thereafter, the brake fluid within the pressure regulation chamber 8 is sucked into and discharged from the pump 10 to supply the brake fluid to the pipe line A2 so that the wheel cylinder pressure is maintained higher than the master cylinder pressure by the differential pressure control valve 7 set in the differential pressure state.

If the suction performance of the pump 10 cannot follow the amount of the brake fluid flowing into the reservoir chamber 82, and the brake fluid has been stored at a predetermined level within the reservoir chamber 82, the valve body 84 sits on the valve seat 85 to shut off between the pipe line A (the master cylinder side) and the suction side of the pump 10. As a result, since the brake fluid within the reservoir chamber 82 is sucked by the pump 10, the amount of the brake fluid stored in the reservoir chamber 82 decreases, and accordingly the shaft 87 pushes up the valve body 84 to supply the brake fluid to the reservoir chamber 82 from the side of the master cylinder.

At this time, the brake fluid leaking from the pump 10 in operation is lead to and stored in the fluid reservoir chamber 881 through the housing hole 92 and the drain passage 93.

In this embodiment, the fluid reservoir chamber 881 is formed in the cover 88 disposed in the housing 9. Accordingly, even if the brake fluid leaks from the fluid reservoir chamber 881, since this brake fluid hardly flows toward the ECU, it is possible to prevent occurrence of electrical defect.

Further, even if the brake fluid stored in the reservoir chamber 82 leaks from the outer periphery of the reservoir piston 81, the cover 88 prevents this brake fluid from flowing to the outside. That is, the cover 88 provides a fail-safe function against leakage of the brake fluid from the reservoir chamber 82.

In the above described embodiment, the O-ring 883 seals between the first flange portion 882 and the housing 9. However, it is possible to seal between the first flange portion 882 and the housing 9 by press-fitting the first flange portion 882 in the housing 9 to eliminate the O-ring 883.

The above explained preferred embodiments are exemplary of the invention of the present application which is described solely by the claims appended below. It should be understood that modifications of the preferred embodiments may be made as would occur to one of skill in the art.

What is claimed is:

1. A hydraulic unit for a vehicle brake apparatus having a master cylinder and a wheel cylinder comprising:
    a housing formed with a pipe line connecting between the master cylinder and the wheel cylinder to allow a brake fluid to pass therethrough;
    a pump disposed in the housing for sucking and discharging the brake fluid to boost pressure of the brake fluid;
    a reservoir piston disposed in a hole formed in the housing so as to be movable slidably back and forth, the reservoir piston partitioning a reservoir chamber within the hole for temporarily storing the brake fluid discharged from the wheel cylinder;
    a cover disposed in the hole to close one end on an atmospheric side of the hole, the cover being formed with a fluid reservoir chamber for storing the brake fluid leaking from the pump, and the cover having a substantially cylindrical shape so that the fluid reservoir chamber is formed in the hole when the cover is inserted in the hole; and
    a drain passage formed in the housing for leading the brake fluid leaking from the pump into the fluid reservoir chamber.

2. The hydraulic unit for a vehicle brake apparatus according to claim 1, wherein the fluid reservoir chamber is a recess portion formed in an outer periphery of the cover, the outer periphery of the cover being opposite to an inner periphery of the hole such that the outer periphery in which the fluid reservoir chamber is formed faces the inner periphery of the hole.

3. The hydraulic unit for a vehicle brake apparatus according to claim 1, wherein the hole opens to a bottom surface of the housing.

4. The hydraulic unit for a vehicle brake apparatus according to claim 1, wherein the reservoir piston is biased by a piston spring in a direction to reduce a volume of the reservoir chamber.

5. The hydraulic unit for a vehicle brake apparatus according to claim 4, wherein the fluid reservoir chamber is fluidly sealed from a space in which the piston spring is housed.

6. The hydraulic unit for a vehicle brake apparatus according to claim 1, wherein the cover is configured to provide a seal between the reservoir chamber and the fluid reservoir chamber.

7. The hydraulic unit for a vehicle brake apparatus according to claim 1, wherein the fluid reservoir chamber is positioned between upper-most and lower-most extents of the cover.

8. The hydraulic unit for a vehicle brake apparatus according to claim 1, the cover further comprising:
    a first flange positioned on an axial end portion of the cover, and a second flange positioned on an opposite axial end portion of the cover, wherein the fluid reservoir chamber is positioned between the first and second flanges.

9. The hydraulic unit for a vehicle brake apparatus according to claim 8, wherein the first and second flanges are attached to an inner periphery of the hole.

10. The hydraulic unit for a vehicle brake apparatus according to claim 1, wherein the fluid reservoir chamber has an annular shape with an inner radius defined by the cover and an outer radius define by the hole.

* * * * *